United States Patent [19]
Grimm et al.

[11] 3,736,726
[45] June 5, 1973

[54] PROCESS FOR THE REMOVAL OF DIMETHYL SULFATE FROM GASES BY ADSORPTION ON ACTIVE CHARCOAL

[75] Inventors: Richard Grimm; Willi Herzog; Rudolf Lakemann, all of Frankfurt/Main, Germany

[73] Assignee: Farbwerke Hoechst Aktiengesellschaft vormals, Meister Lucius & Bruning, Frankfurt am Main, Germany

[22] Filed: Dec. 20, 1971

[21] Appl. No.: 210,049

[30] Foreign Application Priority Data

Dec. 22, 1970   Germany.....................P 20 63 071.1

[52] U.S. Cl.................55/73, 55/DIG. 30, 55/74, 423/245
[51] Int. Cl. ...........................................B01d 53/04
[58] Field of Search.............55/73, 74, 387, DIG. 30; 423/245

[56] References Cited

UNITED STATES PATENTS

| 3,455,089 | 7/1969 | Mattia | 55/74 |
| 3,596,438 | 8/1971 | Beukenkamp | 55/74 |

Primary Examiner—Charles N. Hart
Attorney—Henry W. Koster and Curtis, Morris & Safford

[57] ABSTRACT

Dimethyl sulfate is removed from gases, e.g., from indoor or exhaust air. The gases are conducted through active charcoal to absorb the dimethyl sulfate. The active charcoal is regenerated with a base, then washed with water and re-used for the absorption of dimethyl sulfate without any intermediate drying.

1 Claim, No Drawings

PROCESS FOR THE REMOVAL OF DIMETHYL SULFATE FROM GASES BY ADSORPTION ON ACTIVE CHARCOAL

The present invention relates to a process for the removal of dimethyl sulfate from gases, especially from indoor or exhaust air, wherein the dimethyl sulfate is adsorbed on active charcoal, the adsorbed dimethyl sulfate being then destroyed by treating the charged active charcoal with a base.

Dimethyl sulfate is used to a large extent as a methylating agent. Due to its high toxicity it has to be removed from the indoor air — and in particular from the exhaust air, of plants where it is utilized.

It is known to remove dimethyl sulfate from gases by adsorption on active charcoal. For obvious reasons, the regeneration of active charcoal charged with dimethyl sulfate by simple desorption at elevated temperatures is not feasible in practice. Regeneration of the filters is therefore brought about by rinsing them with bases, preferably with a solution of ammonia, washing with water, drying in a hot gas current and cooling to the adsorption temperature.

It has now been found that, surprisingly, drying of the charcoal after washing is unnecessary and that the charcoal can be employed again immediately afterwards for the adsorption of dimethyl sulfate.

The present invention provides a process for the removal of dimethyl sulfate from gases by adsorbing the dimethyl sulfate on active charcoal, treating the charcoal with a base for the purpose of regeneration, washing it with water, and re-using the regenerated active charcoal for the adsorption of dimethyl sulfate without intermediate drying.

As bases there may be used compounds which react with dimethyl sulfate with formation of water-soluble substances, especially alkali metal hydroxides and preferably ammonia in an aqueous solution of about 2–10 percent strength. When selecting the regeneration agent one should take care that the reaction products resulting from the regeneration do not adversely affect the waste-water purification.

The process according to the invention makes superfluous the drying and cooling of the active charcoal filters after the wet regeneration. Thus, there is no need to provide for equipment heating the air necessary for drying, moreover, time is saved, i.e., the regenerated filters can be used again within a shorter space of time; possibly, one can do with a smaller number of filters.

The following examples illustrate the invention:

EXAMPLE 1

13 g of active charcoal Contarbon BA special of Messrs. Lurgi, Germany are introduced into a glass tube having a 1.6 cm inside diameter to form an adsorbent layer 20 cm in height. Through the layer, 130 Nl of air/h are passed, corresponding to a velocity of flow of 11.6 m/min (with reference to the free-space sectional area), which are charged at 25°C with dimethyl sulfate vapor in a washing bottle containing liquid dimethyl sulfate.

After this treatment the air contains about 650 ppm. of dimethyl sulfate; in the issuing gas the content of dimethyl sulfate is determined by means of a Drager tube having an indicating sensitivity of 1 ppm. After 8 to 9 hours the adsorption limit is reached. The charged adsorbent is treated 5 times with a 5 percent solution of ammonia and washed 5 times with water. The adsorbent layer can then be reused immediately for gas cleaning. In 10 successive tests there was no change in the adsorption limit as to time which was steadily 8 to 9 hours.

EXAMPLE 2

According to Example 1 the layer is regenerated and washed with water, then 130 Nl of air/h are introduced which, besides about 650 ppm of dimethyl sulfate, contains also approximately 3 percent of steam (relative atmospheric moisture 100 percent). After 6.5 to 8 hours the adsorption limit is reached.

EXAMPLE 3

The active charcoal charged with dimethyl sulfate is regenerated with a 5 percent sodium hydroxide solution instead of a 5 percent ammonia solution and washed with water.

Directly upon washing with water 130 Nl of air/h are introduced having a dimethyl sulfate content of about 650 ppm. After 8 to 9 hours the adsorption limit is reached.

EXAMPLE 4

Active charcoal Silicarbon type Nu/D of the Silikagelgesellschaft, Germany, instead of the active charcoal Contarbon BA, special is used. 16 g of this charcoal are needed to form a layer 20 cm in height in a tube of 1.6 cm inside diameter. Through the adsorbent, 130 Nl of air/h having a dimethyl sulfate content of 650 ppm are passed, the adsorption limit being reached after 8 hours. Thereupon the charcoal is treated 5 times with a 5 percent solution of ammonia and then washed 5 times with water. After this treatment also the Silicarbon can be used again for gas cleaning without drying. The adsorption limit is reached after 8 hours, as determined in 3 successive tests.

What is claimed is:

1. A process for the removal of dimethyl sulfate from gases which comprises adsorbing dimethyl sulfate on active charcoal, treating the active charcoal with a base for the purpose of regeneration, washing the charcoal with water, and reusing the regenerated active charcoal for the further adsorption of dimethyl sulfate without any drying.

* * * * *